United States Patent [19]
Ahn et al.

[11] Patent Number: 5,719,940
[45] Date of Patent: Feb. 17, 1998

[54] METHOD FOR PROVIDING INFORMATION SECURITY BY EXCHANGING AUTHENTICATION AND SIGNING AN ELECTRONIC SIGNATURE AND APPARATUS THEREFOR

[75] Inventors: Keum Hyug Ahn; Chung Ryong Jang; Ill Hwan Park, all of Chongno-Ku, Rep. of Korea

[73] Assignee: Korea Telecommunication Authority, Seoul, Rep. of Korea

[21] Appl. No.: 414,785

[22] Filed: Mar. 31, 1995

[30] Foreign Application Priority Data

Mar. 31, 1994 [KR] Rep. of Korea ............... 1994-6854

[51] Int. Cl.$^6$ ............................. H04L 9/00; H04L 9/30; H04L 9/32
[52] U.S. Cl. ................. 380/25; 380/23; 380/30; 380/49
[58] Field of Search .................... 380/23, 25, 30, 380/46, 49, 50

[56] References Cited

U.S. PATENT DOCUMENTS

| | | | |
|---|---|---|---|
| 4,625,076 | 11/1986 | Okamoto et al. | 380/23 |
| 4,969,189 | 11/1990 | Ohta et al. | 380/25 |
| 4,995,082 | 2/1991 | Schnorr | 380/23 |
| 5,140,634 | 8/1992 | Guillou et al. | 380/23 |
| 5,396,558 | 3/1995 | Ishiguro et al. | 380/25 |
| 5,442,707 | 8/1995 | Miyaji et al. | 380/30 |
| 5,446,796 | 8/1995 | Ishiguro et al. | 380/25 X |
| 5,483,597 | 1/1996 | Stern | 380/30 |

*Primary Examiner*—Bernarr E. Gregory
*Attorney, Agent, or Firm*—Merchant, Gould Smith, Edell Welter & Schmidt, P.A.

[57] ABSTRACT

A method for exchanging an authentication and signing an electronic signature, capable of providing a high security and achieving a high efficiency. The method includes the steps of setting p, q and g as system parameters, where p and q are prime numbers while g is an integer, between 1 and p, having the value of 1 when multiplied by the q-th power and then divided by p, and using n secret keys and n public keys for each user, where n is a number not less than 2, the public keys $v_n$ respectively corresponding to the secret keys $S_n$, integers between 1 and q, and being produced based on an equation of $v_n = g^{-sn} \mod p$.

32 Claims, 4 Drawing Sheets

| PROVER (USER A) | | VERIFIER (USER B) |
|---|---|---|
| SYSTEM COEFFICIENTS: g,q,p,t<br>SECRET KEYS: $S_1, S_2$<br>PUBLIC KEYS: $V_1 = g^{-s1}, V_2 = g^{-s2}$ | $ID, V_1, V_2$ →  | CHECK ID, $V_1, V_2$ |
| PRODUCE RANDOM NUMBER $r_1$,<br>CALCULATE $X (X = g^{r_1} \mod p)$,<br>SEND X | X → | |
| PRODUCE RANDOM NUMBERS $r_2$ AND $r_3$,<br>CALCULATE $r (r = r_1 + S_1 r_2 \mod q)$<br>AND $r_4 (r_4 = S_1 r_3 + S_2 \mod q)$,<br>CALCULATE $y_1 (y_1 = r + e r_4 \mod q)$<br>AND $y_2 (y_2 = r_2 + e r_3 \mod q)$,<br>SEND $y_1$ AND $y_2$ | ← e | SELECT RANDOM NUMBER e, SEND e |
| | $y_1, y_2$ → | CALCULATE X'<br>$(X' = g^{y_1} V_1^{y_2} V_2^{e} \mod p)$,<br>VERIFY WHETHER X = X' |

METHOD FOR PROVIDING INFORMATION SECURITY BY EXCHANGING AUTHENTICATION AND SIGNING AN ELECTRONIC SIGNATURE AND APPARATUS THEREFOR

BACKGROUND OF THE INVENTION

1. Field of the Invention

The present invention relates to an authentication exchanging method capable of confirming individual entities processing data and an electronic signing method capable of providing an authentication function, a non-repudiation function for preventing the denial of a data processing action and an integrity of data.

2. Description of the Prior Art

With the rapid development of software technology and semiconductor technology, data processing using computers has commonly been used. In particular, data communications over public communications networks have been dispersed in an information age where information is acknowledged as an asset. In this regard, data passing over public communications networks has an increased importance, as well as data stored in computers. This results in a requirement to protect such data. In this connection, authentication exchanging and electronic signing methods may be used to achieve an identification of each entity performing a data processing, a verification of whether or not a data forgery has been made during the circulation of the data being processed, and a verification of the actuality of an action of data processing.

Of authentication exchanging and electronic signing methods having a security based on the discrete logarithm problem, those associated with the present invention are Schnorr's method and Okamoto's method. The discrete logarithm problem means the problem relating to the fact that it is difficult for a person, who does not involve into calculating x, to find a random number r produced to derive a value x ($x \equiv g^r$ mod p) for achieving an entity verification, even though x and g are known. The value x is obtained by multiplying g, a number between 1 and p (1<g<p), by the r-th power and then dividing the resultant value by p., where, p and q are prime numbers. In particular, q is divisible by (p−1). On the other hand, g is an integer, between 1 and p, having the value of 1 when multiplied by the q-th power and then divided by p (namely, $1 \equiv g^q$ mod p).

In accordance with Schnorr's authentication exchanging method, a prover A produces a random number r between 1 and q in order to verify himself before a verifier B. After producing the random number r, g is multiplied by the r-th power. The resultant value is then divided by p to derive a value x ($x \equiv g^r$ mod p). The value x is sent to the verifier B. Upon receiving the value x from the prover A, the verifier B produces a random number e between 1 and q. The random number e produced by the verifier B is sent to the prover A. The prover A multiplies the random number e received from the verifier B by his secret key s. The resultant value is added to the random number r and then divided by q, thereby deriving a value y ($y \equiv r+es$ mod q). The prover A sends the calculated value y to the verifier B. Upon receiving the value y from the prover A, the verifier B multiplies g by the y-th power. The resultant value is multiplied by the value obtained by multiplying a public key v ($v \equiv g^{-s}$ mod p) by the e-th power and then divided by p, thereby deriving a value $g^y v^e$ mod p. Thereafter, the verifier B checks whether the finally derived value coincides with the value x ($x \equiv g^r$ mod p) from the prover A, in order to verify the authenticity of the prover A. On the other hand, in accordance with Schnorr's electronic signing method, a signer A produces a random number r between 1 and q when he has to put his signature to an electronic document m. After producing the random number r, g is multiplied by the r-th power. The resultant value is then divided by p to derive the modulo x ($x \equiv g^r$ mod p). The modulo x and the document m are hashed by using a hash function, thereby deriving e ($e \equiv h(g^r$ mod p, m)). In order to generate the electronic signature of the signer A appended to the document m, the derived e is multiplied by the secret key s of the signer A. The resultant value is added to the random number r and then divided by q, thereby deriving a value y ($y \equiv r+es$ mod q). The (e,y) derived in the above-mentioned manner constitute the electronic signature of the signer A. For verifying the electronic signature (e,y) of the signer A appended to the document m, g is multiplied by the y-th power. The resultant value is multiplied by the value obtained by multiplying the public key v ($v \equiv g^{-s}$ mod p) of the signer A by the e-th power and then divided by p, thereby deriving a value $g^y v^e$ mod p. The finally derived value and the document m are hashed, thereby deriving a hash value $h(g^y v^e$ mod p,m). Thereafter, a check is made about whether the hash value coincides with e from the signer A, in order to verify the validity of the electronic signature (e,y) of the signer A.

In accordance with Okamoto's method, two secret keys $s_1$ and $s_2$ are used for each user in order to ensure the security of the Schnorr's method. For the same purpose, Okamoto's method also uses two $g_1$ and $g_2$ equivalent to g used in Schnorr's method. In accordance with Okamoto's method, a prover A produces two random numbers $r_1$ and $r_2$ between 1 and q in order to verify himself before a verifier B. After producing the random numbers $r_1$ and $r_2$, $g_1$ is multiplied by the $r_1$-th power while $g_2$ is multiplied by the $r_2$-th power. The resultant values are multiplied together. The resultant value is then divided by p to derive a value x ($x \equiv g_1^{r_1} g_2^{r_2}$ mod p). The value x is sent to the verifier B. Upon receiving the value x from the prover A, the verifier B produces a random number e between 1 and q. The random number e produced by the verifier B is sent to the prover A. The prover A multiplies the random number e received from the verifier B by his one secret key $s_1$. The resultant value is added to the random number $r_1$ and then divided by q, thereby calculating a value $y_1$ ($y_1 \equiv r_1+es_1$ mod q). The prover A also multiplies the random number e by the other secret key $s_2$. The resultant value is added to the random number $r_2$ and then divided by q, thereby deriving a value $y_2$ ($y_2 \equiv r_2+es_2$ mod q). The prover A sends the derived values ($y_1$, $y_2$) to the verifier B. Upon receiving the values ($y_1$, $y_2$) from the prover A, the verifier B multiplies $g_1$ by the $y_1$-th power and $g_2$ by the $y_2$-th power, respectively. The calculated values are multiplied together. The resultant value is then multiplied by the value obtained by multiplying a public key v ($v \equiv g_1^{-s_1} g_2^{-s_2}$ mod p) by the e-th power and then divided by p, thereby deriving a value $g_1^{y_1} g_2^{y_2} v^e$ mod p. Thereafter, the verifier B checks whether the finally derived value coincides with the value x ($x \equiv g_1^{r_1} g_2^{r_2}$ mod p) from the prover A, in order to verify the authenticity of the prover A. On the other hand, in accordance with Okamoto's electronic signing method, a signer A produces two random numbers $r_1$ and $r_2$ between 1 and q when he has to append his signature to an electronic document m. After producing the random numbers $r_1$ and $r_2$, $g_1$ is multiplied by the $r_1$-th power while g2 is multiplied by the $r_2$-th power. The calculated values are multiplied together. The resultant value is then divided by p to derive a value x ($x \equiv g_1^{r_1} g_2^{r_2}$ mod p). The value x and the document m are hashed by using a hash function h, thereby deriving e ($e=h(g_1^{r_1}g_2^{r_2} \bmod p,m)$). In order to generate the electronic signature of the signer A appended to the document m, the derived e is multiplied by one secret key $s_1$ of the signer A. The resultant value is added to the random number $r_1$ and then divided by q, thereby deriving a value $y_1$ ($y_1 \equiv r_1+es_1 \bmod q$). The signer A also multiplies the derived e by the other secret key $s_2$. The resultant value is added to the random number $r_2$ and then divided by q, thereby deriving a value $y_2$ ($y_2 \equiv r_2+es_2 \bmod q$). The (e, $y_1$, $y_2$) derived in the above-mentioned manner constitute the electronic signature of the signer A. For verifying the electronic signature (e, $y_1$, $y_2$) of the signer A appended to the document m, $g_1$ is multiplied by the $y_1$-th power while $g_2$ is multiplied by the $y_2$-th power. The calculated values are multiplied together. The resultant value is then multiplied by the value obtained by multiplying a public key v ($v \equiv g_1^{-s_1} g_2^{-s_2} \bmod p$) by the e-th power and then divided by p, thereby deriving a value $g_1^{y_1} g_2^{y_2} v^e \bmod p$. The finally derived value and the document m are hashed, thereby deriving a hash value $h(g_1^{41} g^{242} v^e \bmod p, m)$. Thereafter, a check is made about whether the hash value coincides with e from the signer A, in order to verify the validity of the electronic signature (e, $y_1$, $y_2$) of the signer A.

In accordance with Okamoto's method, $g_1$ and $g_2$ are used in an authentication exchange and an electronic signature generation in order to prevent a user other than a claimed user A from being disguised as the user A and the electronic signature of the user A from being forged. Okamoto's method also uses two secret keys $s_1$ and $s_2$ for each user and thereby obtains an enhancement in security over Schnorr's method. However, the Okamoto's method involves a difficulty in terms of practical use over the Schnorr's method, taking into consideration of the quantity of calculation required to exchange an authentication, generate an electronic signature and verify it.

SUMMARY OF THE INVENTION

Therefore, an object of the invention is to provide a method of information security service capable of providing a high security and a high efficiency by use of an authentication exchanging method and electroning signing method. The first one is capable of confirming and verifying individual entities processing data upon processing data and transferring the data between the entities and the second one is capable of providing functions of putting an electronic signature to an electronic document, confirming a counterpart transferring or receiving the electronic document, confirming a forgery of the electronic document, and verifying actions of transferring and receiving the electronic document.

In accordance with one aspect, the present invention provides a method for exchanging an authentication and generating an electronic signature, comprising the steps of: setting p, q and g as system parameters, where p and q are prime numbers while $g(1 \equiv g^q \bmod p)$ is an integer, between 1 and p, having the value of 1 when multiplied by the q-th power and then divided by p; and using n secret keys and n public keys for each user, where n is an integer not less than 2, the public keys $v_n$ respectively corresponding to the secret keys $S_n$, where each secret key is an integer between 1 and q, being produced based on an equation of $v_n \equiv g^{-sn} \bmod p$.

In accordance with another aspect, the present invention provides an authentication exchanging method comprising the steps of: producing, by a prover, a random number $r_1$ between 1 and q, calculating a value x ($x \equiv g^{r_1} \bmod p$), where p is a prime number while g is an integer between 1 and p such that $1 \equiv g^q \bmod p$, and sending the value x from the prover to a verifier; producing, by the verifier, a random number e and sending the random number e to the prover; producing, by the prover, random numbers $r_2$ and $r_3$, calculating a value r ($r \equiv r_1+s_1r_2 \bmod q$) and a value $r_4$ ($r_4 \equiv s_1r_3+s_2 \bmod q$) on the basis of secret keys $s_1$ and $s_2$ of the prover together with the random number e received from the verifier to the prover, calculating a value $y_1$ ($y_1 \equiv r+er_4 \bmod q$) and a value $y_2$ ($y_2 \equiv r_2+er_3 \bmod q$) on the basis of r and $r_4$, and sending $y_1$ and $y_2$ to the verifier; and calculating, by the verifier, a value $x'(x' \equiv g^{y_1} v_1^{y_2} v_2^e \bmod p)$ on the basis of $y_1$ and $y_2$ received from the prover to the verifier together with public keys $v_1$ ($v_1 \equiv g^{-s_1} \bmod p$) and $v_2$ ($v_2 \equiv g^{-s_2} \bmod p$) of the prover, and checking whether the modulo x' coincides with x ($x \equiv g^{r_1} \bmod p$) received from the prover. These steps are able to be applied in the same manner as the above to more than two secret keys and two public keys.

In accordance with another aspect, the present invention provides an electronic signing method comprising the steps of: producing a random number $r_1$ by a signer who is a drafter or handler for electronic data m such as an electronic document or a message, calculating a value x ($x \equiv g^{r_1} \bmod p$), where p is a prime number while g is an integer between 1 and p such that $1 \equiv g^q \bmod p$, and hashing the value x with m, thereby deriving e ($e = h(x, m)$); producing, by the signer, random numbers $r_2$ and $r_3$, calculating a value r ($r \equiv r_1+s_1r_2 \bmod q$) and a modulo $r_4$ ($r_4 \equiv s_1r_3+s_2 \bmod q$) on the basis of secret keys $s_1$ and $s_2$ of the signer together with e, and calculating a value $y_1$ ($y_1 \equiv r+er_4 \bmod q$) and a value $y_2$ ($y_2 \equiv r_2+er_3 \bmod q$) on the basis of r and $r_4$, thereby deriving an electronic signature (e, $y_1$, $y_2$) for m; and calculating a value $x'(x' \equiv g^{y_1} v_1^{y_2} v_2^e \bmod p)$ for verifying the electronic signature (e, $y_1$, $y_2$) for m, hashing the value x' with m, and checking whether $h(x', m)$ equals to e constituting a part of the electronic signature. These steps can be applied for more than two secret keys and two public keys in the same manner as the above.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

In an authentication exchanging method and an electronic signing method in accordance with the present invention, three system parameters p, q and g, two secret keys $s_1$ and $s_2$, and two public keys $v_1$ and $v_2$ are used where the number of secret and public key can be increased more than two. The system parameters p and q are prime numbers. In particular, q is divisible by (p−1). On the other hand, g is an integer, between 1 and p, having the value of 1 when multiplied by the q-th power and then divided by p (namely, $1 \equiv g^q$ mod p). As the secret keys $s_1$ and $s_2$ for each user, integers between 1 and q are used ($1 < s_1$, $s_2 < q$). Each user also uses public keys $v_1$ and $v_2$ ($v_1 \equiv g^{-s_1}$ mod p, $v_2 \equiv g^{-s_2}$ mod p) corresponding to the secret keys $s_1$ and $s_2$, respectively.

Figure 1:
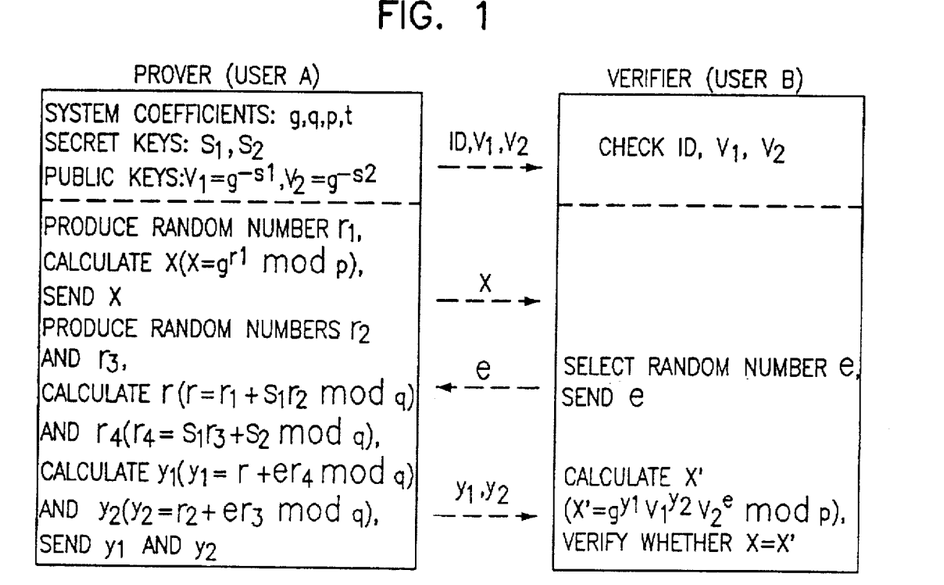
FIG. 1 is a diagram illustrating an authentication exchanging method using "mod q" in accordance with the present invention.

First, the authentication exchanging method in accordance with the present invention will be described in conjunction with FIG. 1.

In accordance with the authentication exchanging method of the present invention, a prover A produces a random number $r_1$ between 1 and q in order to verify himself before a verifier B. After producing the random number $r_1$, g is multiplied by the $r_1$-th power. The resultant value is then divided by p to derive a value x ($x \equiv g^{r_1}$ mod p). The value x is sent to the verifier B. Upon receiving the modulo x from the prover A, the verifier B produces a random number e between 1 and q. The random number e produced by the verifier B is sent to the prover A. Upon receiving the random number e from the verifier B, the prover A produces a random number $r_2$ between 1 and q. Thereafter, the prover A multiplies the random number $r_2$ by his one secret key $s_1$. The resultant value is added to the random number $r_1$ used for the calculation of x and then divided by q, thereby deriving a value r ($r \equiv r_1 + s_1 r_2$ mod q). The prover A also produces a random number $r_3$ between 1 and q. The random number $r_3$ is then multiplied by the secret key $s_1$ of the prover A. The resultant value is added to the secret key $s_2$ of the prover A and then divided by q, thereby deriving a value $r_4$ ($r_4 \equiv s_1 r_3 + s_2$ mod q). The derived value $r_4$ is multiplied by the random number e. The resultant value is added to the value r and then divided by q, thereby the value $y_1$ ($y_1 = r + e r_4$ mod q). The random number $r_3$ is also multiplied by the random number e. The resultant value is added to the random number $r_2$ and then divided by q, thereby the value $y_2$ ($y_2 = r_2 + e r_3$ mod q). In place of calculating both the values $y_1$ and $y_2$ by producing the random numbers $r_2$ and $r_3$, calculating the values r and $r_4$ on the basis of the secret keys $s_1$ and $s_2$ together with the random numbers $r_1$, $r_2$ and $r_3$ and then using the random number e only the value $y_1$ can be calculated to verify the authenticity of the prover A. In this case, only one random number $r_2$ is produced such that it is set as the value $y_2$. The value $y_1$ is derived using the secret keys $s_1$ and $s_2$ together with the random number e. That is, the prover A produces the random number $r_2$ between 1 and q in response to a receipt of the random number e from the verifier B and then determines the random number $r_2$ $y_2$. Thereafter, the prover A multiplies his one select key $s_1$ by $y_2$. The calculated value is then added to the product of the random number e and the other secret key $s_2$. The resultant value is added to the random number $r_1$ used for the calculation of x and then divided by q, thereby deriving a value $y_1$ ($y_1 \equiv r_1 + e s_2 + s_1 y_2$ mod q). The values $y_1$ and $y_2$ derived in such a manner are sent to the verifier B. Upon receiving the modulo $y_1$ and $y_2$, the verifier B multiplies g by the $y_1$-th power. The verifier B also multiplies one public key $v_1$ ($v_1 \equiv g^{-s_1}$ mod p) by the $y_2$-th power. The calculated values are multiplied together. The resultant value is then multiplied by the value obtained after multiplying the other public key $v_2$ ($v_2 \equiv g^{-s_2}$ mod p) by the e-th power. The resultant value is divided by p, thereby deriving the modulo $x'$ ($x' = g^{y_1} v_1^{y_2} v_2^{e}$ mod p). Thereafter, the verifier B checks whether the modulo $x'$ coincides with x ($x \equiv g^{r_1}$ mod p) received from the prover A in order to verify the authenticity of the prover A.

Figure 2:
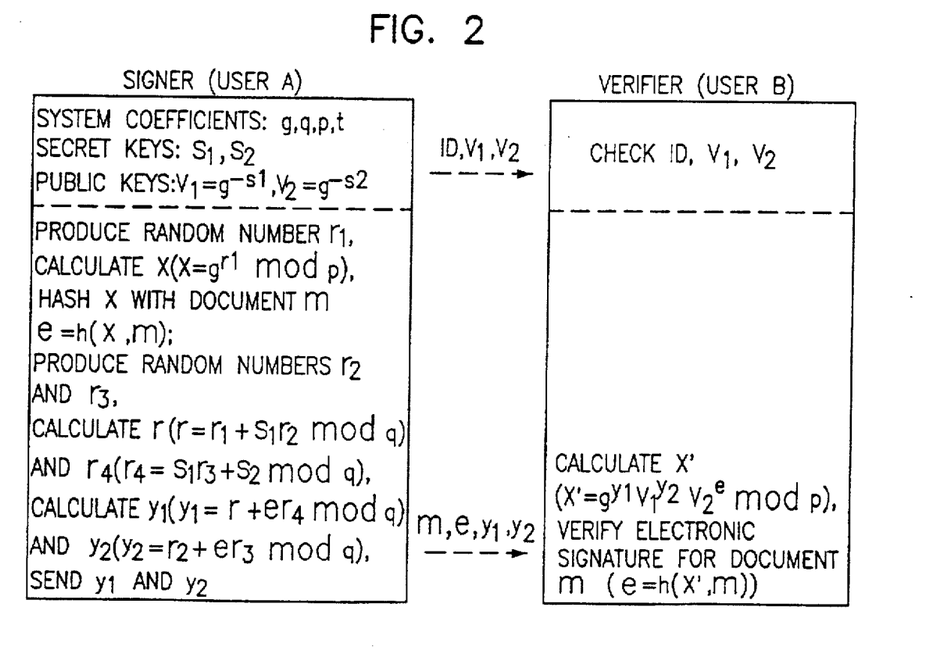
FIG. 2 is a diagram illustrating an electronic signing method using "mod q" in accordance with the present invention.

On the other hand, in accordance with the electronic signing method of the present invention, a signer A produces a random number $r_1$ between 1 and q when he has to append his signature to an electronic document m. After producing the random number $r_1$, g is multiplied by the $r_1$-th power. The calculated value is then divided by p to derive a value x ($x \equiv g^{r_1}$ mod p). The value x and the document m are hashed by using a hash function h, thereby deriving e ($e = h(g^{r_1}$ mod p, m)). The signer A also produces a random number $r_2$ between 1 and q. Thereafter, the signer A multiplies the random number $r_2$ by his one secret key $s_1$. The resultant value is added to the random number $r_1$ used for the calculation of x and then divided by q, thereby deriving a value r ($r \equiv r_1 + s_1 r_2$ mod q). The signer A also produces a random number $r_3$ between 1 and q. The random number $r_3$ is then multiplied by one secret key $s_1$ of the signer A. The resultant value is added to another secret key $s_2$ of the signer A and then divided by q, thereby deriving a value $r_4$ ($r_4 = s_1 r_3 + s_2$ mod q).

The calculated value $r_4$ is multiplied by the random number e. The resultant value is added to the modulo r and then divided by q, thereby the value $y_1$ ($y_1 \equiv r + e r_4$ mod q). The random number $r_3$ is also multiplied by the random number e. The resultant value is added to the random number $r_2$ and then divided by q, thereby the value $y_2$ ($y_2 = r_2 + e r_3$ mod q). In place of calculating both the values $y_1$ and $y_2$ by producing the random numbers $r_2$ and $r_3$, calculating the values r and $r_4$ on the basis of the secret keys $s_1$ and $s_2$ together with the random numbers $r_1$, $r_2$, and $r_3$, and then using the random number e, only the value $y_1$ can be calculated to verify the validity of the electronic signature of the signer A. In this case, only one random number $r_2$ is produced such that it is set as the value $y_2$. The value $y_1$ is derived using the secret keys $s_1$ and $s_2$ together with the random number e. That is, the signer A produces the random number $r_2$ between 1 and q and then determines the random number $r_2$ as $y_2$. Thereafter, the signer A multiplies his one select key $s_1$ by $y_2$. The calculated value is then added to the product of the random number e and the other secret key $s_2$. The resultant value is added to the random number $r_1$ used for the calculation of x and then divided by q, thereby deriving a value $y_1$ ($y_1 \equiv r_1 + e s_2 + s_1 y_2$ mod q). Together with the random number e, the value $y_1$ and $y_2$ derived in such a manner constitute the electronic signature of the signer A. For verifying the electronic signature (e, $y_1$, $y_2$) of the signer A appended to the document m, g is multiplied by the $y_1$-th power. One public key $v_1$ ($v_1 \equiv g^{-s_1}$ mod p) is also multiplied by the $y_2$-th power. The calculated values are multiplied together. The resultant value is then multiplied by the value obtained after multiplying the other public key $v_2$ ($v_2 \equiv g^{-s_2}$ mod p) of the signer A by the e-th power. The resultant value is divided by p, thereby deriving the value $x'$ ($x' = g^{y_1} v_1^{y_2} v_2^{e}$ mod p). The finally derived value $x'$ and the document m are hashed, thereby deriving a hash value h ($x'$, m). Thereafter, a check is made about whether the hash value coincides with e, in order to verify the validity of the electronic signature (e, $y_1$, $y_2$) of the signer A.

Figure 3:
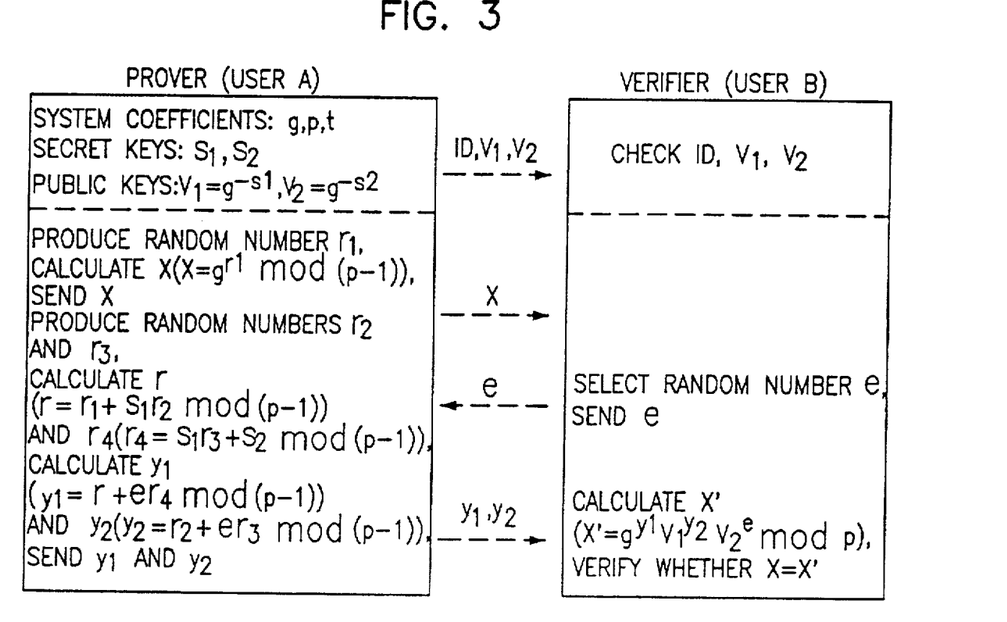
FIG. 3 is a diagram illustrating an authentication exchanging method using "mod (p-1)" in accordance with the present invention.
Figure 4:
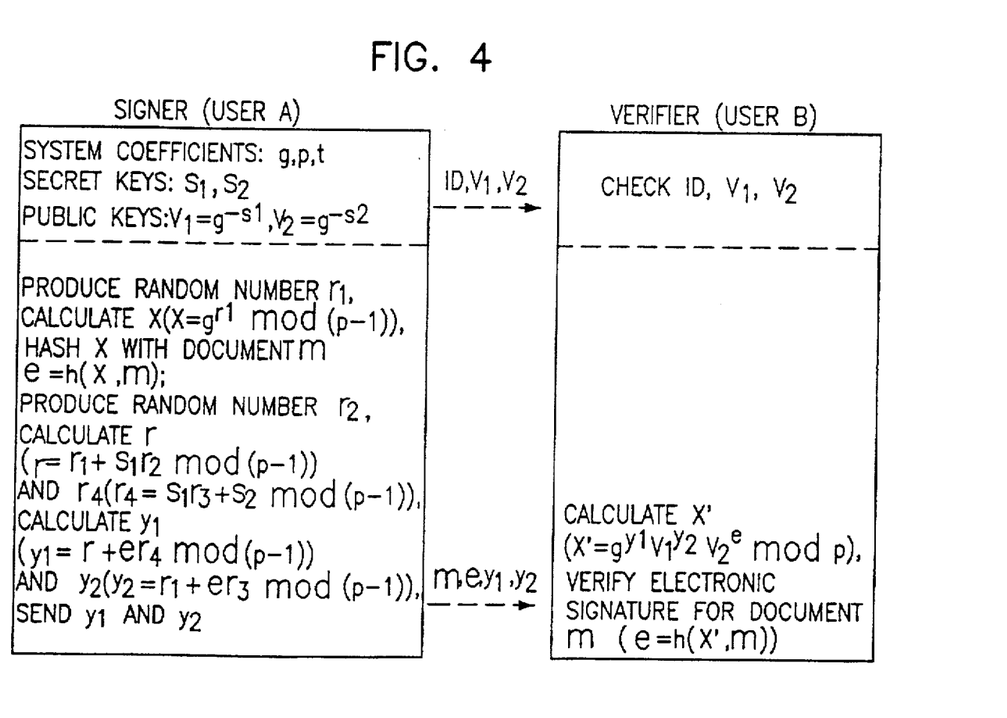
FIG. 4 is a diagram illustrating an electronic signing method using "mod (p-1)" in accordance with the present invention.

Although q is used as the modulus for the calculation of r ($r \equiv r_1 + s_1 r_2$ mod q), $r_4$ ($r_4 = s_1 r_3 + s_2$ mod q), $y_1$ ($y_1 = r + e r_4$ mod q), and $y_2$ ($y_2 \equiv r_2 + er_3$ mod q) in accordance with the authentication exchanging method and electronic signing method of the present invention, p−1 may be used as the modulus, as illustrated in FIGS. 3 and 4. In this case, a prime number p should be used as the modulus p−1 including at least one large factor for the security of each of the methods.

In the authentication exchanging method and electronic signing method of the present invention, the value r is calculated to take the form of $r \equiv r_1 + s_1 + s_1 r_2$ mod q by using the random number $r_1$ used for the calculation of x ($x \equiv g^{r_1}$ mod p), $s_1$, one of the select keys of the user, and the random number $r_2$ together. The value $r_4$ is also calculated to take the form of $r_4 \equiv s_1 r_3 + s_2$ mod q by using the random number $r_3$ and the secret keys $s_1$ and $s_2$ of the user. The values r and $r_4$ are used to calculate $y_1$ taking the form of $y_1 \equiv r + er_4$ mod q and the form of $y_2 \equiv r_2 + er_3$ mod q. The reason why $y_1$ and $y_2$ are calculated in the above-mentioned manner is because for x, the calculation of $g^{r_1}$ mod $p(x \equiv g^{r_1}$ mod p) is equivalent to an implicit calculation of $g^r(g^{-s_1})^{r_2}$ mod p ($x \equiv g^{r_1} \equiv g^{r-s_1 r_2} \equiv g^r g^{-s_1 r_2} \equiv g^r(g^{-s_1})^{r_2}$ mod p), so that the calculation of $g^{r_1}$ mod p using the single random number $r_1$ yields the same effect as the calculation of $g^r(g^{-s_1})^{r_2}$ mod p using two random numbers r and $r_2$.

The effect of this calculation is the same as that obtained in the case of performing a calculation twice in a continued manner. In other words, this calculation must be the efficient method capable of enhancing the security without any increase in the quantity of calculation in the authentication exchanging method and electronic signing method. This is why it is more difficult to derive the random numbers r and $r_2$ used for the calculation of $g^r(g^{-s_1})^{r_2}$ mod p than to derive the single random number $r_1$ used for the calculation of $g^r$ mod p. Actually in the authentication exchanging method and electronic signing method of the present invention, only the calculation of $g^r$ mod p is executed instead of executing the calculation of $g^r(g^{-s_1})^{r_2}$ mod p in order to obtain a high processing rate and yet enhance the security. Consequently, the authentication exchanging method and electronic signing method of the present invention is the efficient method capable of enhancing the security without any increase in the quantity of calculation.

As mentioned above, $y_1$ and $Y_2$ are calculated to take the form of $y_1 \equiv r + er_4$ mod q and the form of $y_2 \equiv r_2 + er_3$ mod q respectively, using the values r ($r \equiv r_1 + s_1 r_2$ mod q) and $r_4$ ($r_4 \equiv s_1 r_3 + s_2$ mod q) calculated by the prover A and the random number e sent from the verifier B to the prover A in the authentication exchanging method of the present invention or using the modulo r ($r \equiv r_1 + s_1 r_2$ mod q) and $r_4$ ($r_4 \equiv r_1 + s_1 r_3 + s_2$ mod q) calculated by the signer A and the hash value e (e=h(x, m)) derived by hashing the document m and the value x ($x \equiv g^{r_1}$ mod p), together with the secret keys $s_1$ and $s_2$ in the electronic signing method of the present invention. In verifying the validity in the authentication exchanging method and electronic signing method of the present invention, the verification calculation of $g^{y_1} v_1^{y_2} v_2^e$ mod p is executed using x, e, $y_1$ and $y_2$ received to the verifier B, together with the public keys $v_1$ and $v_2$ of the counterpart user A. On the basis of the equations of $r \equiv r_1 + s_1 r_2$ mod q and $r_4 \equiv r_1 + s_1 r_3 + s_2$ mod q, the calculation of $g^{y_1} v_1^{y_2} v_2^e$ mod p is equivalent to the case of executing a calculation twice in a continued manner to take the form of $g^r g^{es_2} g^{-es_2}(g^{-s_1})^{r_2}(g^{-s_1})^{er_3}(g^{-s_1})^{-er_3}$ mod p and thereby to verify the validity in the authentication exchanging method and electronic signing method.

Since the secret keys $s_1$ and $s_2$ of the user are indirectly used in the calculation of $y_1$ and $y_2$ in accordance with the present invention, the authentication exchanging method and electronic signing method of the present invention must be the superior method capable of reducing the possibility of the exposure of user's secret keys to others and thereby enhancing the security.

The methods of the present invention have the compatibility with the Schnorr method and the Okamoto (OK92) method. In other words, the methods of the present invention enable an authentication exchange with either of the Schnorr method or the OK92 method and a verification of an electronic signature, generated by either of the Schnorr method or the OK92 method, without any conversion. FIGS. 5 to 8 illustrate the compatibility of the methods of the present invention with the Schnorr method or the OK92 method.

Figure 5:
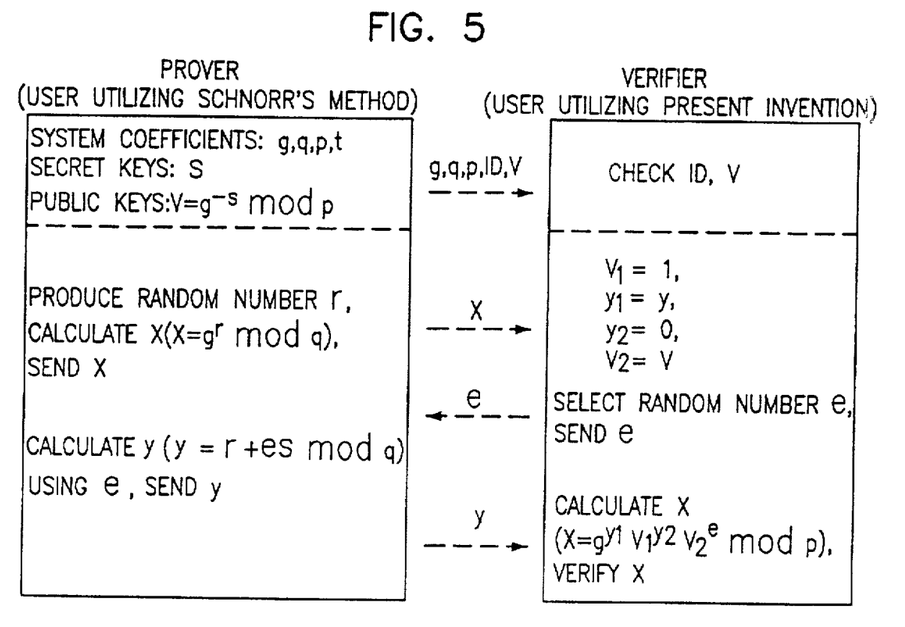
FIG. 5 is a diagram illustrating an authentication exchange between a prover utilizing Schnorr's method and a verifier utilizing the method of the present invention.

FIG. 5 illustrates an authentication exchange between a prover A utilizing the Schnorr method and a verifier B utilizing the method of the present invention. As shown in FIG. 5, the prover A produces a random number r between 1 and q. After producing the random number r, g is multiplied by the r-th power. The resultant value is then divided by p to derive a value x ($x \equiv g^r$ mod p). The value x is sent to the verifier B. Upon receiving the value x from the prover A, the verifier B produces a random number e between 1 and q. The random number e produced by the verifier B is sent to the prover A. The prover A multiplies the random number e received from the verifier B by his secret key s. The resultant value is added to the random number r used for the calculation of x and then divided by q, thereby deriving a value y (y≡r+es mod q). The prover A sends the derived value y to the verifier B. Upon receiving the value y from the prover A, the verifier B uses g received thereto as it is, for $g^{y_1} v_1^{y_2} v_2^e$ mod p. The verifier B also substitutes y received thereto for $y_1$ of $g^{y_1} v_1^{y_2} v_2^e$ mod p. At this time, the public key v of the prover A is also substituted for $v_2$ of $g^{y_1} v_1^{y_2} v_2^e$ mod p. Also, $v_1$ of $g^{y_1} v_1^{y_2} v_2^e$ mod p is substituted by 1 while $y_2$ is substituted by 0. In such a manner, the verifier B calculates $g^{y_1} v_1^{y_2} v_2^e$ mod p. Finally, the verifier B checks whether $g^{y_1} v_1^{y_2} v_2^e$ mod p coincides with x received from the prover A in order to verify the prover A.

Figure 7:
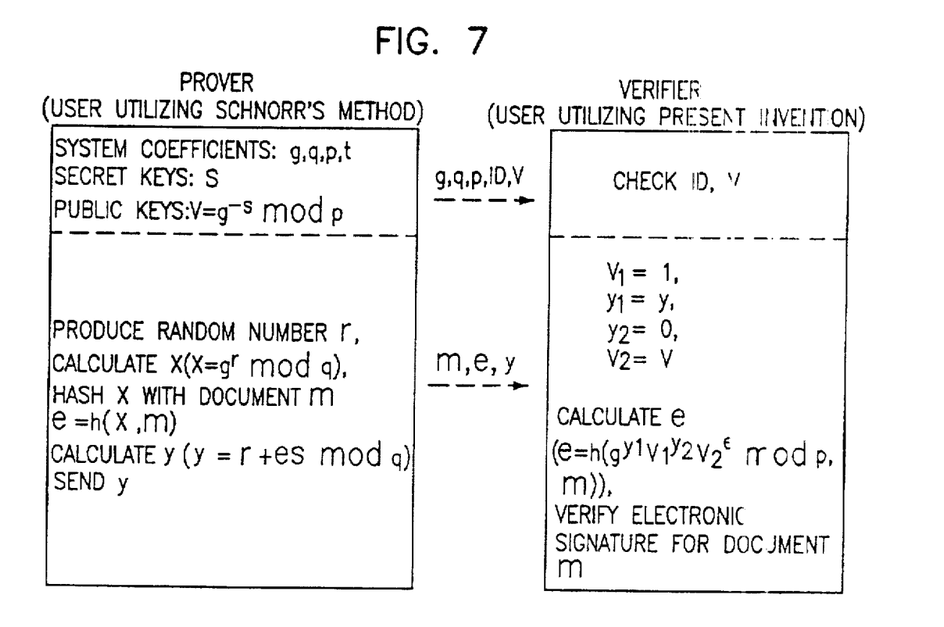
FIG. 7 is a diagram illustrating a verification of the validity of an electronic signature generated by Schnorr's method in accordance with the present invention.

FIG. 7 illustrates a verification of validity of an electronic signature (e, y) appended to an electronic document m produced by a signer A utilizing Schnorr's method. In this case, g is used as it is, for $g^{y_1} v_1^{y_2} v_2^e$ mod p. On the other hand, y is substituted for $y_1$ of $g^{y_1} v_1^{y_2} v_2^e$ mod p. At this time, the public key v of the prover A is also substituted for $v_2$ of $g^{y_1} v_1^{y_2} v_2^e$ mod p. Also, $v_1$ of $g^{y_1} v_1^{y_2} v_2^e$ mod p is substituted by 1 while $y_2$ is substituted by 0. In such a manner, the calculation of $g^{y_1} v_1^{y_2} v_2^e$ mod p is achieved. Together with the document m, $g^{y_1} v_1^{y_2} v_2^e$ mod p is hashed. Finally, the verifier B checks whether the hash value $h(g^{y_1} v_1^{y_2} v_2^e$ mod p, m) coincides with e received from the signer A in order to verify the validity of the electric signature.

Figure 6:
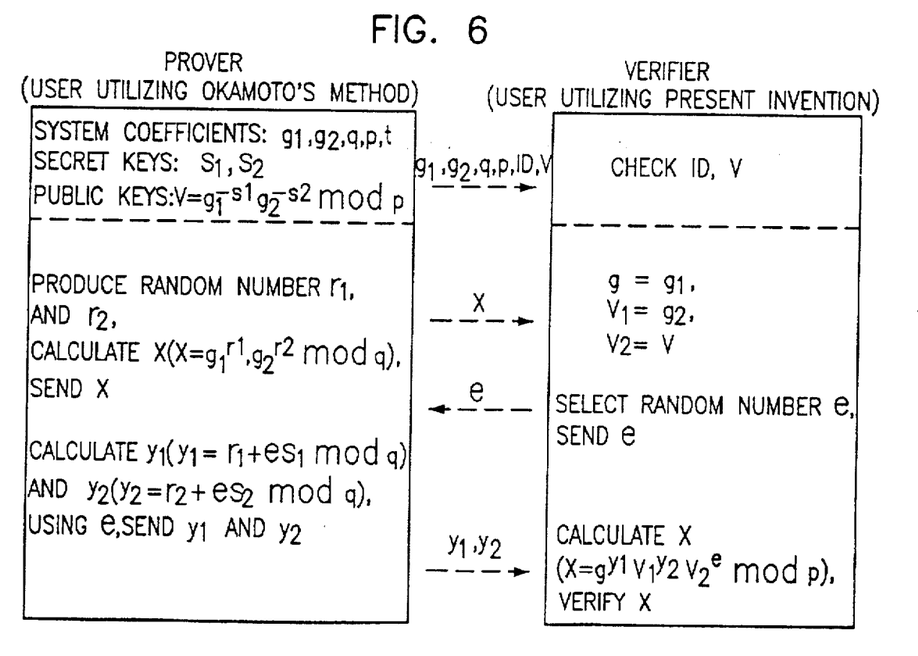
FIG. 6 is a diagram illustrating an authentication exchange between a prover utilizing Okamoto's method and a verifier utilizing the method of the present invention.

FIG. 6 illustrates an authentication exchange between a prover A utilizing Okamoto's method and a verifier B utilizing the method of the present invention. As shown in FIG. 6, the prover A produces two random numbers $r_1$ and $r_2$ between 1 and q. After producing the random numbers $r_1$ and $r_2$, $g_1$ is multiplied by the $r_1$-th power while $g_2$ is multiplied by the $r_2$-th power. The calculated values are multiplied together. The resultant value is then divided by p to derive a value x ($x \equiv g_1^{r_1} g_2^{r_2}$ mod p). The value x is sent to the verifier B. Upon receiving the value x from the prover A, the verifier B produces a random number e between 1 and q. The random number e produced by the verifier B is sent to the prover A. The prover A multiplies the random number e received from the verifier B by his one secret key $s_1$. The calculated value is added to the random number $r_1$ and then divided by q, thereby deriving a value $y_1$ ($y_1 \equiv r_1 + es_1 \mod q$). The prover A also multiplies the random number e by the other secret key $s_2$. The calculated value is added to the random number $r_2$ and then divided by q, thereby deriving a value $y_2$ ($y_2 \equiv r_2 + es_2 \mod q$). The prover A sends the derived values ($y_1, y_2$) to the verifier B. Upon receiving the values ($y_1, y_2$) from the prover A, the verifier B substitutes $g_1$ used by the prover A for g of $g^{y_1} v_1^{y_2} v_2^e \mod p$. On the other hand, the verifier B uses $y_1$ and $y_2$ received thereto as they are. At this time, the public key v of the prover A is also substituted for $v_2$ of $g^{y_1} v_1^{y_2} v_2^e \mod p$. Also, $v_1$ of $g^{y_1} v_1^{y_2} v_2^e \mod p$ is substituted by $g_2$. In such a manner, the verifier B calculates $g^{y_1} v_1^{y_2} v_2^e \mod p$. Finally, the verifier B checks whether $g^{y_1} v_1^{y_2} v_2^e \mod p$ coincides with x received from the prover A in order to verify the prover A.

Figure 8:
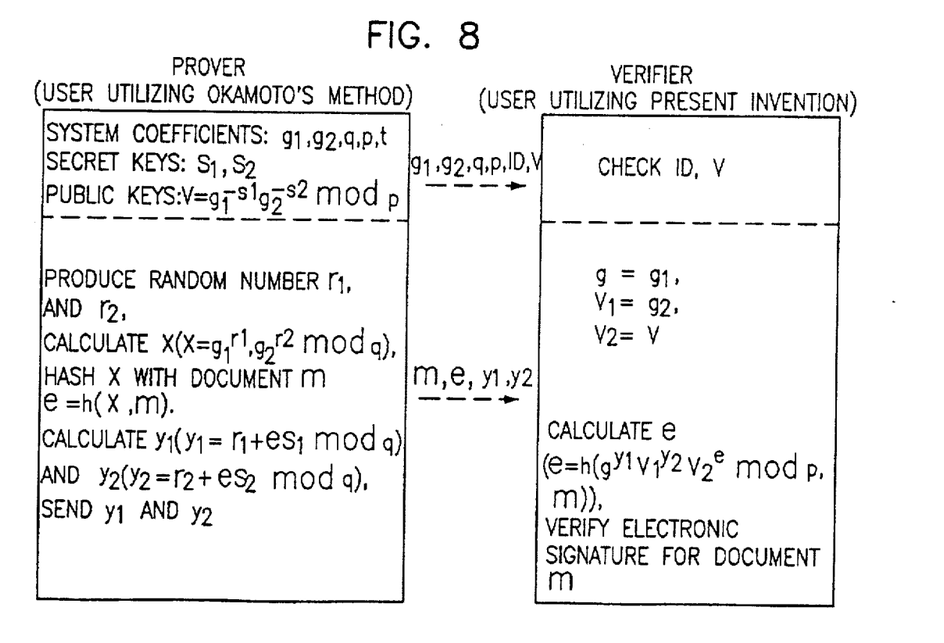
FIG. 8 is a diagram illustrating a verification of the validity of an electronic signature generated by Okamoto's method in accordance with the present invention.

FIG. 8 illustrates a verification of the validity of an electronic signature (e, $y_1, y_2$) appended to an electronic document m produced by a signer A utilizing Okamoto's method. In this case, as the verification procedure in FIG. 6, $g_1$ is substituted for g of $g^{y_1} v_1^{y_2} v_2^e \mod p$. On the other hand, the verifier B uses $y_1$ and $Y_2$ received thereto as they are. At this time, the public key v of the prover A is also substituted for $v_2$ of $g^{y_1} v_1^{y_2} v_2^e \mod p$. Also, $v_1$ of $g^{y_1} v_1^{y_2} v_2^e \mod p$ is substituted by $g_2$. In such a manner, the calculation of $g^{y_1} v_1^{y_2} v_2^e \mod p$ is achieved. Together with the document m, $g^{y_1} v_1^{y_2} v_2^e \mod p$ is hashed. Finally, the verifier B checks whether the hash value $h(g^{y_1} v_1^{y_2} v_2^e \mod p, m)$ coincides with e received from the signer A in order to verify the validity of the electric signature.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for providing an information security service between two electronic data processing entities, comprising steps of:

(a) setting p, q and g as information security service parameters, where p and q are prime numbers while g is an integer, between 1 and p, having the value of 1 when multiplied by the q-th power and then divided by p;

(b) generating a plurality of data security signals representative of n secret keys and n public keys based on an equation of $V_n \equiv g^{-sn} \mod p$, where n is not less than 2, and the public keys $V_n$ are respectively corresponding to the secret keys $S_n$ as integers between 1 and q; and (c) communicating the generated data security signals between the two electronic data processing entities to perform an authentication process.

2. A method in accordance with claim 1, wherein q used as a modulus is replace by p−1.

3. An authentication method for authenticating a prover electronic data processing entity to a verifier electronic data processing entity within an electronic data processing system and authenticating data transferring between the prover entity and the verifier entity, comprising steps of:

(a) sending a first signal representative of a value x from the prover entity to the verifier entity, the first signal being produced, by the prover entity, by calculating the value x ($x \equiv g^{r_1} \mod p$), where p and q are prime numbers, g is an integer between 1 and p, and $r_1$ is a random number between 1 and q;

(b) sending a second signal representative of a random number e from the verifier entity to a prover entity, the second signal being produced, by the verifier entity, by generating a random number e;

(c) sending a third and fourth signal representative of a value $y_1$ and $y_2$, respectively, from the prover entity to the verifier entity after receiving the second signal, the third and fourth signal being produced, by the prover entity, by calculating the value $y_1$ ($y_1 \equiv r + er_4 \mod q$) and the value $y_2$ ($y_2 \equiv r_2 + er_3 \mod q$), where $r_2$ and $r_3$ are random numbers, the value r is calculated according to a function ($r \equiv r_1 + s_1 r_2 \mod q$), the value $r_4$ is calculated according to a function ($r_4 \equiv s_1 r_3 + s_2 \mod q$), and $s_1$ and $s_2$ are secret keys of the prover entity; and (d) determining whether the prover entity is authentic by comparing the first signal with a fifth signal representative of a value x' after receiving the first, third and fourth signals, the fifth signal being produced, by the verifier entity, by calculating a value $x'(x' \equiv g^{y_1} v_1^{y_2} v_2^e \mod p)$, where $v_1$ and $v_2$ are public keys of the prover entity calculated according to functions ($V_1 \equiv g^{-s_1} \mod p$) and ($V_2 \equiv g^{-s_2} \mod p$).

4. A method in accordance with claim 3, wherein q used as a modulus is replace by p−1.

5. A signing method for a verifier electronic data processing entity to verify authenticity of an electronic signature produced by signer electronic data processing entity within an electronic data processing system, comprising steps of:

(a) sending a first signal representative of electronic data m and a second signal representative of an electronic signature (e, $y_1, y_2$) for m from the signer entity to the verifier entity, the second signal being produced, by the signer entity, by calculating a value e by hashing a value x with m (e=h(x, m)), a value $y_1$ ($y_1 \equiv r + er_4 \mod q$), and a value $y_2$ ($y_2 \equiv r_2 + er_3 \mod q$), where the value x is calculated according to a function ($x \equiv g^{r_1} \mod p$), p and q are prime numbers, g is an integer between 1 and p, $r_1, r_2$ and $r_3$ are random numbers, the value r is calculated according to a function ($r \equiv r_1 + s_1 r_2 \mod q$), the value $r_4$ is calculated according to a function ($r_4 \equiv s_1 r_3 + s_2 \mod q$), and $s_1$ and $s_2$ are secret keys of the signer entity; and (b) determining whether the document m from signer entity is authentic by hashing the first signal representative of m with a third signal representative of a value x' to generate a hash value h(x', m) and comparing the hash value h(x', m) with a portion of the second signal representative of the value e after receiving the first and second signals, the third signal being produced, by the verifier entity, by calculating a value $x'(x' \equiv g^{y_1} v_1^{y_2} v_2^e \mod p)$, where $v_1$ and $v_2$ are public keys of the signer entity calculated according to functions ($V_1 \equiv g^{-s_1} \mod p$) and ($V_2 \equiv g^{-s_2} \mod p$).

6. A method in accordance with claim 5, wherein q used as a modulus is replace by p−1.

7. An authentication method for authenticating a prover electronic data processing entity to a verifier electronic data processing entity within an electronic data processing system, comprising steps of:

(a) sending a second signal representative of a random number e from the verifier entity to a prover entity, the second signal being produced by the verifier entity, by generating a random number e, the second signal being sent responsive to a first signal representative of a value x being sent from the prover entity to the verifier entity, the first signal being produced, by the prover entity, by calculating the value x ($x \equiv g^r$ mod p), where p and q are prime numbers, g is an integer between 1 and p, and r is a random number; and (b) determining whether the prover entity is authentic by comparing the first signal with a fourth signal representative of a value x' after receiving the first signals, the fourth signal being produced, by the verifier, entity, by calculating a value x'($x' \equiv g^{y_1} v_1^{y_2} v_2^e$ mod p), where y is substituted for $y_1$, 1 is substituted for $v_1$, 0 is substituted for $y_2$, and v is substituted for $v_2$, v is a public key of the prover entity calculated according to a function ($V \equiv g^{-s}$ mod p), and s is a secret key of the prover entity, the fourth signal being generated responsive to a third signal representative of a value y being sent from the prover entity to the verifier entity, the third signal being produced, by the prover entity, by calculating a value y ($y \equiv r + es$ mod q).

8. An authentication method for authenticating a prover electronic data processing entity to a verifier electronic data processing entity within an electronic data processing system, comprising steps of:

(a) sending a second signal representative of a random number e from the verifier entity to a prover entity, the second signal being produced by the verifier entity, by generating a random number e, the second signal being sent responsive to a first signal representative of a value x being sent from the prover entity to the verifier entity, the first signal being produced, by the prover entity, by calculating the value x ($x \equiv g_1^{r_1} g_2^{r_2}$ mod p), where p and q are prime numbers, $g_1$ and $g_2$ are integers between 1 and p, and $r_1$ and $r_2$ are random numbers; and (b) determining whether the prover entity is authentic by comparing the first signal with a fifth signal representative of a value x' after receiving the first signals, the fifth signal being produced, by the verifier entity, by calculating a value x'($x' \equiv g^{y_1} v_1^{y_2} v_2^e$ mod p), where $g_2$ is substituted for $v_1$, v is substituted for $v_2$, $g_1$ is substituted for g, v is a public key of the prover entity calculated according to a function ($V \equiv g_1^{-s_1} g_2^{-s_2}$ mod p), and $s_1$ and $s_2$ are secret keys of the prover entity, the fifth signal being generated responsive to a third and a fourth signal representative of a value $y_1$ and $y_2$, respectively, being sent from the prover entity to the verifier entity, the third and the fourth signal being produced, by the prover entity, by calculating a value $y_1$ ($y_1 \equiv r_1 + es_1$ mod q) and a value $y_2$ ($y_2 \equiv r_2 + es_s$ mod q).

9. An electronic signing method for a verifier electronic data processing entity to verify authenticity of an electronic signature produced by signer electronic data processing entity within an electronic data processing system, comprising steps of:

(a) producing a third signal representative of a value x', by the verifier entity, by calculating the value x'($x' \equiv g^{y_1} v_1^{y_2} v_2^e$ mod p), where y is substituted for $y_1$, 1 is substituted for $v_1$, 0 is substituted for $y_2$, and v is substituted for $v_2$, v is a public key of the prover entity calculated according to a function ($V \equiv g^{-s}$ mod p), and s is a secret key of the prover entity, the third signal being produced responsive to a first signal representative of electronic date m and a second signal representative of an electronic signature (e, y) for m being sent from the signer entity to the verifier entity, the second signal being produced, by the signer entity, by calculating a value y ($y \equiv r + es$ mod q) and by calculating a value e by hashing a value x with m (e=h(x, m)) where the value x is calculated according to a function ($x \equiv g^r$ mod p), p and q are prime numbers, g is an integer between 1 and p, r is a random number, and s is a secret key of the signer entity;

(b) hashing the first signal representative of m with the third signal representative of the value x' to generate a hash value h(x', m); and (c) determining whether the document m from signer entity is authentic by comparing the hash value h(x', m) with a portion of the second signal representative of the value.

10. An electronic signing method for a verifier electronic data processing entity to verify authenticity of an electronic signature produced by signer electronic data processing entity within an electronic data processing system, comprising steps of:

(a) producing a third signal representative of a value x', by the verifier entity, by calculating the value x'($x' \equiv g^{y_1} v_1^{y_2} v_2^e$ mod p), where $g_2$ is substituted for v, v is substituted for $v_2$, $g_1$ is substituted for g, v is a public key of the prover entity calculated according to the function ($V \equiv g_1^{-s_1} g_2^{-s_2}$ mod p), p and q are prime numbers, $g_1$ and $g_2$ are integers between 1 and p, and $s_1$ and $s_2$ are secret keys of the signer entity, the third signal being produced responsive to a first signal representative of electronic data m and a second signal representative of an electronic signature (e, $y_1$, $y_2$) for m being sent from the signer entity to the verifier entity, the second signal being produced, by the signer entity, by calculating the value $y_1$ ($y_1 \equiv r_1 + es_1$ mod q) and a value $y_2$ ($y_2 \equiv r_2 + es_2$ mod q) and by calculating a value e by hashing a value x with m (e=h(x, m)) where the value x is calculated according to a function ($x \equiv g_1^{r_1} g_2^{r_2}$ mod p), e, $r_1$ and $r_2$ are random numbers;

(b) hashing the first signal representative of m with the third signal representative of the value x' to generate a hash value h(x', m); and (c) determining whether the document m from signer entity is authentic by comparing the hash value h(x', m) with a portion of the second signal representative of the value.

11. An authentication method for authenticating a prover electronic data processing entity to a verifier electronic data processing entity within an electronic data processing system and authenticating data transferring between the prover entity and the verifier entity, comprising steps of:

(a) sending a first signal representative of the value x from the prover entity to the verifier entity, the first signal being produced, by the prover entity, by calculating the value x ($x \equiv g^{r_1}$ mod p), where p and q are prime numbers, g is an integer between 1 and p, and $r_1$ is a random number between 1 and q;

(b) sending a second signal representative of a random number e from the verifier entity to a prover entity, the second signal being produced, by the verifier entity, by generating a random number e;

(c) sending a third and fourth signal representative of a value $y_1$ and $y_2$, respectively, from the prover entity to the verifier entity after receiving the second signal, the third and the fourth signal being produced, by the prover entity, by setting the value $y_2$ equal to a random number $r_2$ and by calculating the value $y_1$ ($y_1 \equiv r_1 + es_2 + s_1 y_2$ mod q), where $s_1$ and $s_2$ are secret keys of the prover entity; and (d) determining whether the prover entity is authentic by comparing the first signal with a fifth signal representative of a value x' after receiving the first, third and fourth signals, the fifth signal being produced, by the verifier entity, by calculating a value $x'$ ($x'\equiv g^{y_1}v_1^{y_2}v_2^e$ mod p), where $v_1$ and $v_2$ are public keys of the prover entity calculated according to functions ($V_1\equiv g^{-s_1}$ mod p) and ($V_2\equiv g^{-s_2}$ mod p).

12. A signing method for a verifier electronic data processing entity to verify authenticity of an electronic signature produced by signer electronic data processing entity within an electronic data processing system, comprising steps of:

(a) sending a first signal representative of electronic data m and a second signal representative of an electronic signature (e, $y_1$, $y_2$) for m from the signer entity to the verifier entity, the second signal being produced by the signer entity, by calculating a value e by hashing a value x with m (e=h(x, m)), a value $y_1$ ($y_1\equiv r_1+es_2 s_1y_2$ mod q), and setting a value $y_2$ equal to a random number $r_2$, where the value x is calculated according to a function ($x\equiv g^{r_1}$ mod p), p and q are prime numbers, g is an integer between 1 and p, $r_1$ and $r_2$ are random numbers, and $s_1$ and $s_2$ are secret keys of the signer entity; and (b) determining whether the document m from signer entity is authentic by hashing the first signal representative of m with a third signal representative of a value x' to generate a hash value h(x', m) and comparing the hash value h(x', m) with a portion of the second signal representative of the value e after receiving the first and second signals, the third signal being produced, by the verifier entity, by calculating a value $x'$($x'\equiv g^{y_1}v_1^{y_2}v_2^e$ mod p, where $v_1$ and $v_2$ are public keys of the signer entity.

13. A prover electronic data processing entity for enabling authentication of the prover entity to a verifier electronic data processing entity and authentication of data transferring between the prover entity and the verifier entity, the prover entity comprising:

(a) signal generation means for (i) producing a first signal representative of a value x by calculating the value x ($x\equiv g_1^{r_1}g_2^{r_2}$ mod p, (ii) producing a third signal representative of a value $y_1$ by calculating the value $y_1$ ($y_1\equiv r+er_4$ mod q), and (iii) producing a fourth signal representative of a value $y_2$ by calculating the value $y_2$ ($y_2\equiv r_2+er_3$ mod q), where p and q are prime numbers, $g_1$ and $g_2$ are integers between 1 and p, $r_1$, $r_2$ and $r_3$ are random numbers between 1 and q, the value r is calculated according to a function ($r\equiv r_1+s_1r_2$ mod q), the value $r_4$ is calculated according to a function ($r_4\equiv s_1r_3+s_2$ mod q), and $s_1$ and $s_2$ are secret keys of the prover entity; and (b) communication means, operatively coupled to the signal generation means, for (i) sending the first signal from the prover entity to the verifier entity and (ii) sending a third and fourth signal representative of a value $y_1$ and $y_2$, respectively, from the prover entity to the verifier entity in response to receiving a second signal representative of a random number e generated by the verifier entity.

14. The prover entity of claim 13 wherein g is substituted for $g_1$, 1 is substituted for $g_2$, and 0 is substituted for $r_1$.

15. The prover entity of claim 13 wherein 1 is substituted for $g_2$, $r_1$ is substituted for r, 0 is substituted for $y_2$, and $s_1$ is substituted for $r_4$.

16. The prover entity of claim 13 wherein $r_1$ is substituted for r, $s_1$ is substituted for $r_4$, and $s_2$ is substituted for $r_3$.

17. The prover entity of claim 13 wherein g is substituted for $g_1$, 1 is substituted for $g_2$, 0 is substituted for $r_1$, y is substituted for $y_1$, and $r_2$ is substituted for $y_2$, where y is calculated according to a function $y_1$ ($y_1\equiv r_1+es_2+s_1y_2$ mod q).

18. A verifier electronic data processing entity for enabling authentication of a prover entity to the verifier electronic data processing entity and authentication of data transferring between the prover entity and the verifier entity, the verifier entity comprising:

(a) signal generation means for producing a second signal representative of a random number e;

(b) communication means, operatively coupled to the signal generation means, for (i) sending the second signal from the verifier entity to the prover entity in response to receiving a first signal representative of a value x produced by the prover entity and (ii) receiving the first signal, a third representative of a value $y_1$, and a fourth signal representative of a value $y_2$, from the prover entity, the first signal being produced, by the prover entity, by calculating the value x ($x\equiv g_1^{r_1}g_2^{r_2}$ mod p), the third signal being produced, by the prover entity, by calculating the value $y_1$ ($y_1\equiv r+er_4$ mod q), and the fourth signal being produced, by the prover entity, by calculating the value $y_2$ ($y_2\equiv r_2+er_3$ mod q), where p and q are prime numbers, g, $g_1$ and $g_2$ are integers between 1 and p, $r_1$, $r_2$ and $r_3$ are random numbers between 1 and q, the value r is calculated according to a function ($r\equiv r_1+s_1r_2$ mod q), the value $r_4$ is calculated according to a function ($r_4\equiv s_1r_3+s_2$ mod q), and $s_1$ and $s_2$ are secret keys of the prover entity; and (c) comparison means, operatively coupled to the signal generation means and the communication means, for determining whether the prover entity is authentic by comparing the first signal with a fifth signal representative of a value x' after receiving the first, third and fourth signals, the fifth signal being produced, by the verifier entity, by calculating a value $x'$($x'\equiv g^{y_1}v_1^{y_2}v_2^e$ mod p), where $v_1$ and $v_2$ are public keys of the prover entity calculated according to functions ($V_1\equiv g^{-s_1}$ mod p) and ($V_2\equiv g^{-s_2}$ mod p).

19. The verifier entity of claim 18 wherein g is substituted for $g_1$, 1 is substituted for $g_2$, and 0 is substituted for $r_1$.

20. The verifier entity of claim 18 wherein 1 is substituted for $g_2$, $r_1$ is substituted for r, 0 is substituted for $y_2$, 1 is substituted for $v_1$, and $s_1$ is substituted for $r_4$.

21. The verifier entity of claim 18 wherein $r_1$ is substituted for r, $s_1$ is substituted for $r_4$, $g_2$ is substituted for $v_1$, v is substituted for $v_2$, and $s_2$ is substituted for $r_3$, where v is a public key of the prover entity calculated according to a function ($V\equiv g_1^{-21}g_2^{-s_2}$ mod p).

22. The verifier entity of claim 18 wherein g is substituted for $g_1$, 1 is substituted for $g_2$, 0 is substituted for $r_1$, y is substituted for $y_1$, and $r_2$ is substituted for $y_2$, where y is calculated according to a function $y_1$ ($y_1\equiv r_1+es_2+s_1y_2$ mod q).

23. A signer electronic data processing entity for enabling verification of authenticity of an electronic signature produced by the signer entity by a verifier electronic data processing entity, the signer entity comprising:

(a) signal generation means for generating a first signal representative of electronic data m and a second signal representative of an electronic signature (e, $y_1$, $y_2$) for m, the second signal being produced, by the signer entity, by calculating a value e by hashing a value x with m (e=h(x, m)), a value $y_1$ ($y_1\equiv r+er_4$ mod q), and a value $Y_2$ ($y_2\equiv r_2+er_3$ mod q), where the value x is calculated according to a function x ($x\equiv g_1^{r_1}g_2^{r_2}$ mod p), p and q are prime numbers, g, $g_1$ and $g_2$ are integers between 1 and p, $r_1$, $r_2$ and $r_3$ are random numbers between 1 and q, the value r is calculated according to a function ($r\equiv r_1+s_1r_2$ mod q), the value $r_4$ is calculated according to a function ($r_4 \equiv s_1 r_3 + s_2$ mod q), and $s_1$ and $s_2$ are secret keys of the signer entity; and (b) communication means, operatively coupled to the signal generation means, for sending the first and the second signal from the signer entity to the verifier entity.

24. The signer entity of claim 23 wherein g is substituted for $g_1$, 1 is substituted for $g_2$, and 0 is substituted for $r_1$.

25. The signer entity of claim 23 wherein 1 is substituted for $g_2$, $r_1$ is substituted for r, 0 is substituted for $y_2$, and $s_1$ is substituted for $r_4$.

26. The signer entity of claim 23 wherein $r_1$ is substituted for r, $s_1$ is substituted for $r_4$, and $s_2$ is substituted for $r_3$.

27. The signer entity of claim 23 wherein g is substituted for $g_1$, 1 is substituted for $g_2$, 0 is substituted for $r_1$, y is substituted for $y_1$, and $r_2$ is substituted for $y_2$, where y is calculated according to a function $y_1$ ($y_1 \equiv r_1 + es_2 + s_1 y_2$ mod q).

28. A verifier electronic data processing entity for enabling verification of authenticity of an electronic signature produced by a signer electronic data processing entity by the verifier entity, the verifier entity comprising:

(a) communication means for receiving a first representative of electronic data m and a second signal representative of an electronic signature (e, $y_1$, $y_2$) for m from the signer entity to the verifier entity, the second signal being produced, by the signer entity, by calculating a value e by hashing a value x with m (e=h(x, m)), a value $y_1$ ($y_1 \equiv r + er_4$ mod q), and a value $y_2$ ($y_2 \equiv r_2 + er_3$ mod q), where the value x is calculated according to a function x ($x \equiv g_1^{r_1} g_2^{r_2}$ mod p), p and q are prime numbers, g, $g_1$ and $g_2$ are integers between 1 and p, $r_1$, $r_2$ and $r_3$ are random numbers between 1 and q, the value r is calculated according to a function ($r \equiv r_1 + s_1 r_2$ mod q), the value $r_4$ is calculated according to a function ($r_4 \equiv s_1 r_3 + s_2$ mod q), and $s_1$ and $s_2$ are secret keys of the signer entity; and (b) signal generation means, operatively coupled to the communication means, for producing a third signal representative of a value x' by calculating the value x' (x'$\equiv g^{y_1} v_1^{y_2} v_2^e$ mod p), where $v_1$ and $v_2$ are public keys of the signer entity calculated according to functions ($V_1 \equiv g^{-s_1}$ mod p) and ($V_2 \equiv g^{-s_2}$ mod p);

(c) comparison means, operatively coupled to the communication means, for determining whether the document m from signer entity is authentic by hashing the first signal representative of m with the third signal representative of a value x' to generate a hash value h(x', m) and comparing the hash value h(x', m) with a portion of the second signal representative of the value e after receiving the first and second signals.

29. The verifier entity of claim 28 wherein g is substituted for $g_1$, 1 is substituted for $g_2$, and 0 is substituted for $r_1$.

30. The verifier entity of claim 28 wherein 1 is substituted for $g_2$, $r_2$ is substituted for r, 0 is substituted for $y_2$, 1 is substituted for $v_1$, and $s_1$ is substituted for $r_4$.

31. The verifier entity of claim 28 wherein $r_1$ is substituted for r, $s_1$ is substituted for $r_4$, $g_2$ is substituted for $v_1$, v is substituted for $v_2$, and $s_2$ is substituted for $r_3$, where v is a public key of the prover entity calculated according to a function ($V \equiv g_1^{-s_1} g_2^{-s_2}$ mod p).

32. The verifier entity of claim 28 wherein g is substituted for $g_1$, 1 is substituted for $g_2$, 0 is substituted for $r_1$, y is substituted for $y_1$, and $r_2$ is substituted for $y_2$, where y is calculated according to a function $y_1$ ($y_1 \equiv r_1 + es_2 + s_1 y_2$ mod q).

* * * * *

UNITED STATES PATENT AND TRADEMARK OFFICE
CERTIFICATE OF CORRECTION

PATENT NO. : 5,719,940
DATED : FEBRUARY 17, 1998
INVENTOR(S) : AHN ET AL.

It is certified that error appears in the above-identified patent and that said Letters Patent is hereby corrected as shown below:

Title page, [75] Inventors: "Chongno-Ku." Should read -- Seoul, --

Col. 1, line 42: delete "," after "p,"

Col. 3, line 20: "$h(g_1^{41}g^{242}v^e \mod p,m)$" should read -- $h(g_1^{y_1}g_2^{y_2}v^e \mod p,m)$ --

Col. 5, line 15: "$v_1 \equiv g^{-s_1} \mod p, v_2 \equiv g^{s_2} \mod p)$" should read -- $(v_1 \equiv g^{-s_1} \mod p, v_2 \equiv g^{-S_2} \mod p)$ --

Col. 7, line 42: "$Y_2$" should read -- $y_2$ --

Col. 9, line 22: "$Y_2$" should read -- $y_2$ --

Col. 10, line 36: "$(y_2 r_2$" should read -- $(y_2 \equiv r_2$ --

Col. 12, line 17: "for v," should read -- for $v_1$, --

Col. 13, line 1: "value$x^1$" should read -- value $x^1$ --

Col. 14, line 46: "$(V \equiv g_1^{-21}$" should read -- $(V \equiv g_1^{-S_1}$ --

Col. 14, line 62: "$Y_2$" should read -- $y_2$ --

UNITED STATES PATENT AND TRADEMARK OFFICE
CERTIFICATE OF CORRECTION

PATENT NO. : 5,719,940

DATED : FEBRUARY 17, 1998

INVENTOR(S) : AHN ET AL.

It is certified that error appears in the above-identified patent and that said Letters Patent is hereby corrected as shown below:

Col. 15, line 30: "$r_{2+er_3}$" should read — $r_2 + er_3$ —

Col. 16, line 21: "$r_2$" should read — $r_1$ —

Signed and Sealed this

First Day of December, 1998

BRUCE LEHMAN

*Attest:*

*Attesting Officer*           *Commissioner of Patents and Trademarks*